(12) United States Patent
Yan

(10) Patent No.: US 11,472,677 B2
(45) Date of Patent: Oct. 18, 2022

(54) SHIP UNLOADING CONTROL SYSTEM, SHIP LOADING CONTROL SYSTEM, AND RELATED SYSTEMS AND APPARATUSES

(71) Applicant: BEIJING TUSEN ZHITU TECHNOLOGY CO., LTD., Beijing (CN)

(72) Inventor: Chao Yan, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 171 days.

(21) Appl. No.: 16/677,436

(22) Filed: Nov. 7, 2019

(65) Prior Publication Data

US 2020/0140242 A1    May 7, 2020

(30) Foreign Application Priority Data

Nov. 7, 2018 (CN) .......................... 201811321216.2

(51) Int. Cl.
*B66C 13/48* (2006.01)
*B63H 25/02* (2006.01)
(Continued)

(52) U.S. Cl.
CPC .............. *B66C 13/48* (2013.01); *B63H 25/02* (2013.01); *B65G 67/603* (2013.01);
(Continued)

(58) Field of Classification Search
CPC .............. B63H 25/02; B63H 2025/028; B65G 67/603; G05D 1/0217; G06Q 10/0631;
(Continued)

(56) References Cited

U.S. PATENT DOCUMENTS 6,081,292 A * 6/2000 Lanigan, Jr. .......... B66C 19/007
                                                       414/139.6
6,931,314 B2 * 8/2005 Holland ............... B65G 63/004
                                                       414/803
(Continued)

OTHER PUBLICATIONS

Distributed Agent Architecture for Port Automation (Year: 2002).*
(Continued)

*Primary Examiner* — A. Hunter Wilder
*Assistant Examiner* — Nicole Elena Bruner
(74) *Attorney, Agent, or Firm* — Paul Liu; Julie J. Muyco; Perkins Coie, LLP

(57) ABSTRACT

The present disclosure provides a ship unloading control system, a ship loading control system and related systems and apparatuses, capable of achieving fully automated ship loading and unloading. The ship unloading control system includes: a scheduling center system configured to generate a ship unloading plan based on ship information and container information of a target ship and shore crane apparatus information, generate a ship berthing task and a ship unloading task based on the ship unloading plan, and transmit the ship berthing task and the ship unloading task to a ship control system of the target ship and a shore crane control system of a target shore crane apparatus, respectively; the ship control system configured to transmit the ship information and the container information to the scheduling center system, control the target ship to move to an operation area corresponding to the target shore crane apparatus in accordance with the received ship berthing task, and transmit a ship in-position notification message to the shore crane control system of the target shore crane apparatus; and the shore crane control system configured to control, upon receiving the ship in-position notification message from the ship control system, the target shore crane apparatus to load
(Continued)

a container on the target ship onto a transportation vehicle in accordance with the ship unloading task.

7 Claims, 5 Drawing Sheets

(51) Int. Cl.
| | |
|---|---|
| B65G 67/60 | (2006.01) |
| G06Q 50/28 | (2012.01) |
| G06Q 10/08 | (2012.01) |
| G06Q 10/06 | (2012.01) |
| G06Q 10/10 | (2012.01) |
| G05D 1/02 | (2020.01) |

(52) U.S. Cl.
CPC ....... *G05D 1/0217* (2013.01); *G06Q 10/0631* (2013.01); *G06Q 10/083* (2013.01); *G06Q 10/087* (2013.01); *G06Q 10/109* (2013.01); *G06Q 50/28* (2013.01); *B63H 2025/028* (2013.01)

(58) Field of Classification Search
CPC ... G06Q 10/083; G06Q 10/087; G06Q 10/109
USPC ....................................................... 212/285
See application file for complete search history.

(56) References Cited

U.S. PATENT DOCUMENTS

| | | | | | |
|---|---|---|---|---|---|
| 7,547,173 | B2* | 6/2009 | Jung | ................... | B65G 63/004 414/284 |
| 7,753,637 | B2* | 7/2010 | Benedict | .............. | B65G 63/004 414/141.3 |
| 7,972,102 | B2* | 7/2011 | Ward | .................... | B66C 19/007 414/137.1 |
| 8,087,867 | B2* | 1/2012 | Tian | ....................... | B66C 19/002 212/326 |
| 8,225,948 | B2* | 7/2012 | De Jong | ............... | B66C 19/002 212/316 |
| 2002/0161675 | A1* | 10/2002 | Kawase | ............. | G06Q 10/0875 340/870.1 |
| 2003/0167214 | A1* | 9/2003 | Kang | ................. | G06Q 10/0875 705/29 |
| 2005/0131574 | A1* | 6/2005 | Takehara | ................ | G06Q 10/08 700/213 |
| 2008/0252417 | A1* | 10/2008 | Thomas | ................. | G06Q 10/08 340/10.1 |
| 2009/0164345 | A1* | 6/2009 | Pierce | .................... | G05B 15/02 705/29 |
| 2011/0251716 | A1* | 10/2011 | Buzzoni | ................ | G06Q 10/06 700/229 |
| 2014/0180566 | A1* | 6/2014 | Malhotra | ................ | G08G 3/02 340/984 |
| 2015/0112476 | A1* | 4/2015 | Torson | ................ | G06Q 10/047 700/214 |
| 2017/0316379 | A1* | 11/2017 | Lepek | .................. | G06Q 10/083 |
| 2019/0066033 | A1* | 2/2019 | Mains, Jr. | ........ | G06Q 10/06311 |

OTHER PUBLICATIONS

Research on Horizontal Transport Optimization System of Container Terminal (Year: 2010).*

Comprehensive Review of Quay Crane Scheduling, Yard Operations and Integrations thereof in Container Terminals (Year: 2020).*

* cited by examiner

SHIP UNLOADING CONTROL SYSTEM, SHIP LOADING CONTROL SYSTEM, AND RELATED SYSTEMS AND APPARATUSES

CROSS-REFERENCE TO RELATED APPLICATION(S)

This patent document claims the benefit of priority of Chinese Patent Application No. 201811321216.2, filed Nov. 7, 2018. The entire content of the before-mentioned patent application is incorporated by reference as part of the disclosure of this application.

TECHNICAL FIELD

The present disclosure relates to intelligent control technology, and more particularly, to a ship unloading control system, a ship loading control system and related systems and apparatuses.

BACKGROUND

As a hub station for waterway-land coordinated transportation, a port is a buffer for conversion of transportation schemes of containerized goods, and plays an important role in the whole container transportation process. At the port, container transportation operations such as container unloading and container loading are required for inbound and outbound containers.

The process of container unloading is generally as follows. After a ship arrives at a port, a container is first moved onto a transportation vehicle by a shore crane (or shore bridge). Then, the container is transported by the transport vehicle to a yard (or warehouse center). Finally, the container on the transportation vehicle is placed at a corresponding location in the yard by a warehouse hoisting apparatus (such as a rail-mounted gantry crane, a rubber-tired gantry crane, a forklift, etc.) near the yard, thereby completing the ship unloading operation.

The process of container loading is generally as follows. A container in a yard is lifted and placed onto a transportation vehicle by a warehouse hoisting apparatus at the yard, and transported by the transportation vehicle to a shore crane where a ship is located. The container on the transportation vehicle is placed onto the ship by the shore crane, thereby completing the ship loading operation.

SUMMARY

In an aspect, a ship unloading control system is provided according to an embodiment of the present disclosure. The ship unloading control system includes: a scheduling center system configured to generate a ship unloading plan based on ship information and container information of a target ship and shore crane apparatus information, generate a ship berthing task and a ship unloading task based on the ship unloading plan, and transmit the ship berthing task and the ship unloading task to a ship control system of the target ship and a shore crane control system of a target shore crane apparatus, respectively; the ship control system configured to transmit the ship information and the container information to the scheduling center system, control the target ship to move to an operation area corresponding to the target shore crane apparatus in accordance with the received ship berthing task, and transmit a ship in-position notification message to the shore crane control system of the target shore crane apparatus; and the shore crane control system configured to control, upon receiving the ship in-position notification message from the ship control system, the target shore crane apparatus to load a container on the target ship onto a transportation vehicle in accordance with the ship unloading task.

In another aspect, a shore crane control system is provided according to an embodiment of the present disclosure. The shore crane control system includes at least one machine executable instruction. The at least one machine executable instruction includes a shore crane communication module and a hoisting control module. The at least one machine executable instruction is executed by a processor such that: the shore crane communication module is configured to transmit and receive information, and the hoisting control module is configured to receive a ship unloading task from a scheduling center system via the shore crane communication module, and upon receiving a ship in-position notification message from a ship control system via the shore crane communication module, control a target shore crane apparatus to load a container on a target ship onto a transportation vehicle in accordance with the ship unloading task.

In another aspect, a shore crane control system is provided according to an embodiment of the present disclosure. The shore crane control system includes at least one processor and at least one memory. The at least one memory stores the above shore crane control system executable by the at least one processor.

In another aspect, a shore crane apparatus is provided according to an embodiment of the present disclosure. The shore crane apparatus includes the shore crane control system according to the above embodiment.

In another aspect, a ship loading control system is provided according to an embodiment of the present disclosure. The ship loading control system includes: a scheduling center system configured to determine a ship loading plan based on ship information, container information, and shore crane apparatus information, generate a ship berthing task and a ship loading task based on the ship loading plan, and transmit the ship berthing task and the ship loading task to a ship control system of a target ship and a shore crane control system of a target shore crane apparatus, respectively; the ship control system configured to control, upon receiving the ship berthing task, the target ship to move to an operation area corresponding to the target shore crane apparatus, and transmit a ship in-position notification message to the shore crane control system of the target shore crane apparatus; and the shore crane control system configured to control, upon receiving the ship in-position notification message from the ship control system, the target shore crane apparatus to load a container on a transportation vehicle onto the target ship in accordance with the received ship loading task.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, exemplary embodiments of the present disclosure will be described in further detail with reference to the figures. While the exemplary embodiments of the present disclosure are shown in the figures, it is to be noted that the present disclosure can be implemented in various forms and are not limited to the embodiments described below. Rather, these embodiments are provided to facilitate a more thorough understanding of the present disclosure and to convey the scope of the present disclosure fully to those skilled in the art.

Conventionally at a port, the above container transportation operations such as loading and unloading require human intervention. For example, ships need to be steered and controlled by humans to berth at specified locations. Hoisting apparatus and transportation vehicles need to be driven and operated by operators to perform operations such as container loading, container unloading and transportation. Yards or warehouse centers also need human intervention to arrange locations at which containers are to be placed. Thus, the conventional container transportation operations at the port have low level of intelligence and require a large amount of human resources, resulting in a low operation efficiency. Further, due to the complicated environment in the field, it is difficult to guarantee the safety of the operators. Moreover, the labor cost is relatively high as a large number of operators are required.

With the ship unloading control system and ship loading control system according to the embodiments of the present disclosure, for an operation of unloading/loading a container from/onto a ship at a port, a scheduling center system, a ship control system and a shore crane control system exchange information with each other, so as to achieve fully automated, unmanned ship loading/unloading operations at the port, thereby improving the intelligence level of the loading/unloading and transportation operations of containers at the port, reducing requirements on human resources and labor cost, improving operation efficiency and avoiding the problem associated with lack of safety guarantee for operators.

Embodiment 1

Figure 1:
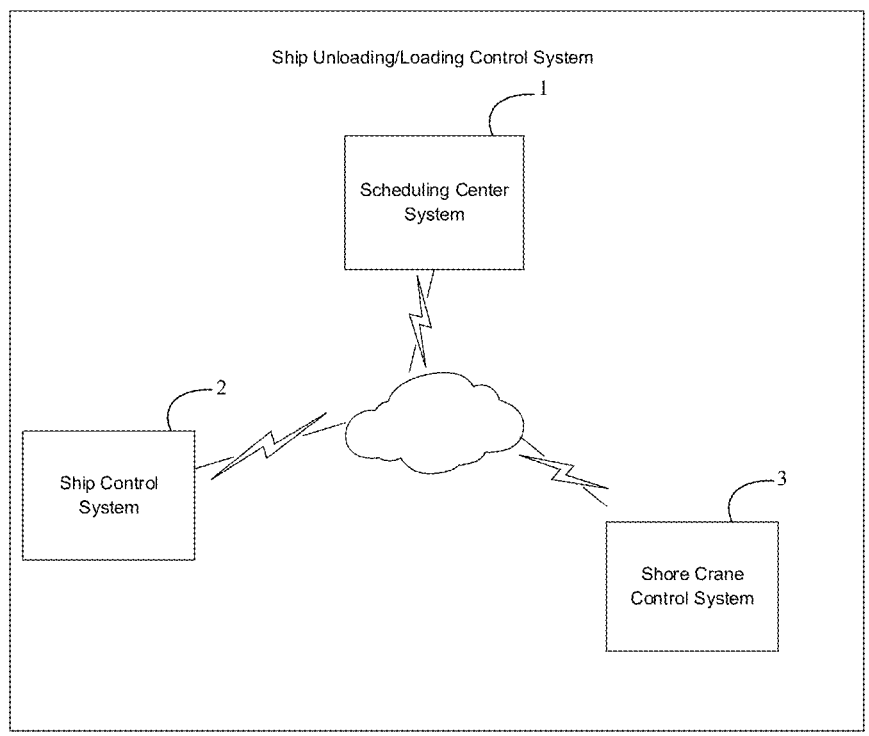
FIG. 1 is a first schematic diagram showing a structure of a ship unloading control system and a ship loading control system according to an embodiment of the present disclosure.

FIG. 1 shows a ship unloading control system according to Embodiment 1 of the present disclosure. Referring to FIG. 1, the ship unloading control system includes a scheduling center system 1, a ship control system 2 provided at a ship, and a shore crane control system 3 provided at a shore crane apparatus.

The scheduling center system 1 is configured to generate a ship unloading plan based on ship information and container information of a target ship and shore crane apparatus information, generate a ship berthing task and a ship unloading task based on the ship unloading plan, and transmit the ship berthing task and the ship unloading task to the ship control system 2 of the target ship and the shore crane control system 3 of a target shore crane apparatus, respectively (i.e., the scheduling center system 1 transmits the ship berthing task to the ship control system 2 of the target ship and transmits the ship unloading task to the shore crane control system 3 of the target shore crane apparatus).

The ship control system 2 is configured to transmit the ship information and the container information to the scheduling center system 1, control the target ship to move to an operation area corresponding to the target shore crane apparatus in accordance with the received ship berthing task, and transmit a ship in-position notification message to the shore crane control system 3 of the target shore crane apparatus.

The shore crane control system 3 is configured to control, upon receiving the ship in-position notification message from the ship control system 2, the target shore crane apparatus to load the container on the target ship onto a transportation vehicle in accordance with the ship unloading task.

In some optional embodiments, the ship information may include ship arrival time and ship state information. The shore crane apparatus information may include operation time information of each shore crane apparatus in a port area. The container information may include a number of containers and identification information and a type of goods carried by each container. The ship information and the container information can be transmitted from the ship control system 2 of the target ship to the scheduling center system 1. The shore crane apparatus information may be information pre-stored in the scheduling center system 1. Alternatively, each shore crane apparatus in the port area can transmit its own shore crane apparatus information to the scheduling center system 1. The scheduling center system 1 generating the ship unloading plan based on the ship information and container information of the target ship and the shore crane apparatus information may include: determining the target shore crane apparatus based on the ship arrival time and the operation time information of each shore crane apparatus in the shore crane apparatus information; estimating ship unloading start time and ship unloading end time based on the ship arrival time, the operation time information of the target shore crane apparatus and the number of containers, and determining a target container area for each container based on the type of goods carried by the container and information on container areas in the port area; and generating the ship unloading plan containing identification information of the target ship, identification information of the target shore crane apparatus, the ship unloading start time, the ship unloading end time and the identification information and the target container area for each container.

In an embodiment, the ship unloading start time can be determined by: determining whether the target shore crane apparatus is in an idle state at the ship arrival time based on the operation time of the target shore crane apparatus; and if so, determining the ship arrival time or the time at which the ship has arrived and berthed as the ship unloading start time, or otherwise determining the time at which the target shore crane apparatus completes the task it is performing at the ship arrival time as the ship unloading start time.

In an embodiment, the ship unloading end time can be determined by: calculating a time length required for the target shore crane apparatus to unload all containers on the target ship to be unloaded at the port based on a historical operation rate of the target shore crane apparatus; and obtaining the ship unloading end time based on the ship unloading start time and the time length.

As an implementation of the embodiment of the present disclosure, the scheduling center system 1 determining the target shore crane apparatus based on the ship arrival time and the operation time information of each shore crane apparatus in the shore crane apparatus information may include: determining one or more shore crane apparatuses available at the ship arrival time based on the ship arrival time and the operation time information of each shore crane apparatus; and selecting one of the determined one or more shore crane apparatuses as the target shore crane apparatus. The available shore crane apparatus may refer to a shore crane apparatus that is in an idle state at the arrival time of the target ship, or a shore crane apparatus that is about to complete its operation task at the arrival time of the target ship.

As an implementation of the embodiment of the present disclosure, when determining the target shore crane apparatus based on the ship arrival time and the operation time information of each shore crane apparatus in the shore crane apparatus information, if the operation area of the target ship is enough for two or more shore crane apparatuses to perform hoisting operations, the scheduling center system 1 can select two or more of the shore crane apparatuses in the idle state based on size information and the operation area of the ship, as target shore crane apparatuses. In the ship unloading operation, different target shore crane apparatuses can hoist containers within their respective operation ranges in accordance with the ship unloading task and load the containers onto transportation vehicles, so as to shorten the operation time and improve the operation efficiency.

As an implementation of the embodiment of the present disclosure, during the ship unloading process, if the currently determined target shore crane apparatus cannot meet a container hoisting requirement, e.g., when the currently determined target shore crane apparatus malfunctions during the hoisting operation, the scheduling center system 1 can reselect another available hoisting apparatus as a new target shore crane apparatus based on current time information and the operation time information of each shore crane apparatus in the shore crane apparatus information.

As an implementation of the embodiment of the present disclosure, the scheduling center system 1 can determine the target container area for each container based on the type of goods carried by the container and the information on container areas in the port area as follows. The warehouse center in the port area can be divided into different container areas depending on the types of goods they can store. The scheduling center system 1 can obtain the type of goods carried by the container and determine the target container area in the warehouse center for storing the type of goods to store the container unloaded from the ship based on information on the types of goods each container area in the warehouse center of the port area can store.

In some optional embodiments, the scheduling center system 1 generating the ship berthing task and the ship unloading task based on the ship unloading plan may include: generating the ship berthing task containing identification information and an operation area of the target shore crane apparatus, based on the ship unloading plan; and generating the ship unloading task containing identification information of the target ship, ship unloading start time, ship unloading end time and identification information and a target container area for each container, based on the ship unloading plan.

In some optional embodiments, the ship unloading task may include a ship unloading task list recording the identification information of the target ship, the identification information of the target shore crane apparatus, the identification information of each container to be unloaded at the port and its corresponding target container area.

In some optional embodiments, the ship control system 2 transmitting the ship information and the container information to the scheduling center system 1 may include: determining a travel time length from a current location of the target ship to the port based on the current location, a location of the port and a travel route; estimating arrival time at which the target ship arrives at the port based on the travel time length and current time; and transmitting the ship information containing the estimated arrival time and ship state information and the container information to the scheduling center system 1.

In an embodiment, the arrival time at which the target ship arrives at the port can be estimated based on a departure location, the location of the target port and the predetermined travel route when the target ship is to travel from the departure location to the target port. In particular, the ship control system 2 of the target ship can determine the predetermined travel route based on the departure location and the location of the port, estimate a travel speed of the ship based on a current weather condition and maritime information obtained at the time of departure, calculate the required travel time length of the ship and obtain the estimated arrival time based on the current time.

In an embodiment, the arrival time at which the target ship arrives at the port can be obtained as follows. While the target ship is traveling, the ship control system 2 can determine the location of the ship, calculate the required travel time length of the ship based on the location of the ship, the location of the port, the travel route and a current travel speed of the ship, and obtain the estimated arrival time based on the current time.

In an embodiment, while the target ship is traveling, it may encounter various different travel conditions, e.g., the weather or maritime conditions may vary or the ship may need to wait or yield to other ships, such that the ship may not be able to travel according to the travel route and speed predetermined at the time of departure. In this case, the ship control system 2 can determine the location of the target ship, re-plan the route based on the location of the target ship, determine the travel speed, calculate the required travel time length of the ship, obtain the estimated arrival time based on the current time, and transmit the newly estimated arrival time to the scheduling center system 1.

In an embodiment, when the target ship approaches the area where the target shore crane apparatus is located, the ship control system 2 can determine the location of the target shore crane apparatus, plan a travel route and control the target ship to move to the operation area of the target shore crane apparatus in accordance with the received ship berthing task containing the identification information and operation area of the target shore crane apparatus. When the target ship is in position, the ship control system 2 can transmit the ship in-position notification message to the shore crane control system 3 of the target shore crane apparatus.

In an embodiment, after entering a wireless signal coverage of the port, the ship control system 2 of the target ship can establish communication with the target shore crane apparatus wirelessly based on the identification information of the target shore crane apparatus, determine the location of the target shore crane apparatus based on the identification information of the target shore crane apparatus, plan a route for moving to the operation area of the target shore crane apparatus, adjust the planed travel route by communicating with the shore crane apparatus, arrive at the operation area and prepare for container unloading.

In an embodiment of the present disclosure, the target ship can plan the travel route from the location of the target ship to the port or from the current location to the operation area by using any existing navigation algorithm or by using any third-party navigation software (the present disclosure is not limited thereto).

In an embodiment of the present disclosure, the ship state information may include information on the remaining fuel, information on the current location, information on the tonnage of the ship, information on the draught of the ship, and the like. In generating the ship unloading plan, the scheduling center system 1 can schedule a ship having a low level of remaining fuel to berth first based on the information on the remaining fuel of the ship, select a shore crane apparatus having an appropriate distance from the shore crane apparatuses in the idle state based on the information on the current location, select a shore crane apparatus suitable for the target ship to berth from the shore crane apparatuses in the idle state based on the information on the tonnage and draught of the ship, and finally select one shore crane apparatus as the target shore crane apparatus.

In some optional embodiments, the shore crane control system 3 controlling the target shore crane apparatus to load the container on the target ship onto the transportation vehicle in accordance with the ship unloading task may include: the shore crane control system 3 confirming an identity of each container on the target ship in a predetermined container unloading order and control the target shore crane apparatus to hoist each container when its identity is confirmed; and controlling, upon receiving a vehicle in-position notification message from a vehicle control system of the transportation vehicle, the target shore crane apparatus to load the container onto the transportation vehicle, marking the container in the ship unloading task as in an unloaded state, and transmitting a ship unloading completion notification message to the scheduling center system 1 and/or the ship control system 2 of the target ship when determining that all containers in the ship unloading task are in the unloaded state.

In an embodiment, the predetermined container unloading order may be an order in which containers are unloaded by columns, from top to bottom per column. The shore crane control system 3 can be further configured to, when confirmation of the identity fails, lift and place the container on top of another column of containers whose identities have been confirmed on the target ship.

In an embodiment, the containers on the target ship can be arranged in columns, with multiple containers being stacked in layers in each column. The predetermined container unloading order can be obtained as follows. The shore crane control system 3 can determine the location of each container to be unloaded on the ship based on the ship information and container information in the ship unloading task, and generate a container unloading order in which the containers are unloaded by columns, from top to bottom per column, based on the number of containers to be unloaded and the identification information of each of the containers.

In an embodiment, when the shore crane control system 3 is controlling the shore crane apparatus to unload the containers on the ship, the containers on the target ship can be unloaded by columns, layer by layer from top to bottom per column (the containers are unloaded one column after another). When the hoisting process begins, the shore crane control system 3 can confirm an identity of a container on the ship based on the identification information of the container in the ship unloading task, control the target shore crane apparatus to lift the container when the identity is confirmed, and upon receiving the vehicle in-position notification message from the vehicle control system 4 of the transportation vehicle, control the target shore crane apparatus to load the container onto the transportation vehicle and mark the container in the ship unloading task as in the unloaded state.

In an embodiment of the present disclosure, different contains carried by the target ship may have different destination ports and only some of the containers need to be unloaded at the target port. Thus, when unloading the container, it is required to re-arrange the container not to be unloaded at the target port on the target ship. In order to reduce the workload of the shore crane apparatus, the shore crane control system 3 can confirm an identity of a container on the ship based on the identification information of the container in the ship unloading task, and when the confirmation of the identity fails, control the target shore crane apparatus to lift and place the container on top of another column of containers whose identities have been confirmed on the target ship.

In an embodiment of the present disclosure, when the containers are loaded onto the target ship for transportation, they can be loaded in different categories depending on their respective destination ports. In this way, when the target ship arrives at each destination port, the containers to be unloaded at the destination port can be unloaded from the ship, so as to reduce the workload of hoisting operations at their destination ports and improve the operation efficiency.

In an embodiment of the present disclosure, due to the limited operation area of the shore crane apparatus, in order to improve the operation efficiency, the shore crane control system 3 can control the target shore crane apparatus to lift the container first, and while the container is in a lifted state, upon receiving the vehicle in-position notification message from the vehicle control system 4 of the transportation vehicle, load the container onto the transportation vehicle. After the container is loaded, the transportation vehicle leaves the container loading location immediately. The shore crane control system 3 can control the target shore crane apparatus to lift the next container to be loaded and wait for the vehicle in-position notification for the next transportation vehicle. Each time a loading operation for a container has completed, the container in the ship unloading task is marked as in the unloaded state, until the ship unloading task is completed. When confirming that all containers in the ship unloading task are in the unloaded state, the shore crane control system 3 can transmit a ship unloading completion notification message to the scheduling center system 1 and/or the ship control system 2 of the target ship.

In some optional embodiments, a tag containing the identification information of the container can be provided at the surface of the container. For example, the tag can be a Quick Response (QR) code or a barcode, and the shore crane control system 3 can confirm the identity of the container on the target ship by recognizing the QR code or barcode on the container.

In an embodiment, the shore crane control system 3 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoisting arm of the target shore crane apparatus and can obtain the identification information of the container by scanning the QR code or barcode on the container, compare the identification information of the container with the identification information of the container in the ship unloading task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the ship unloading task, and determining that the identity is confirmed when they match each other, or otherwise determining that the confirmation of the identity fails.

Figure 2:
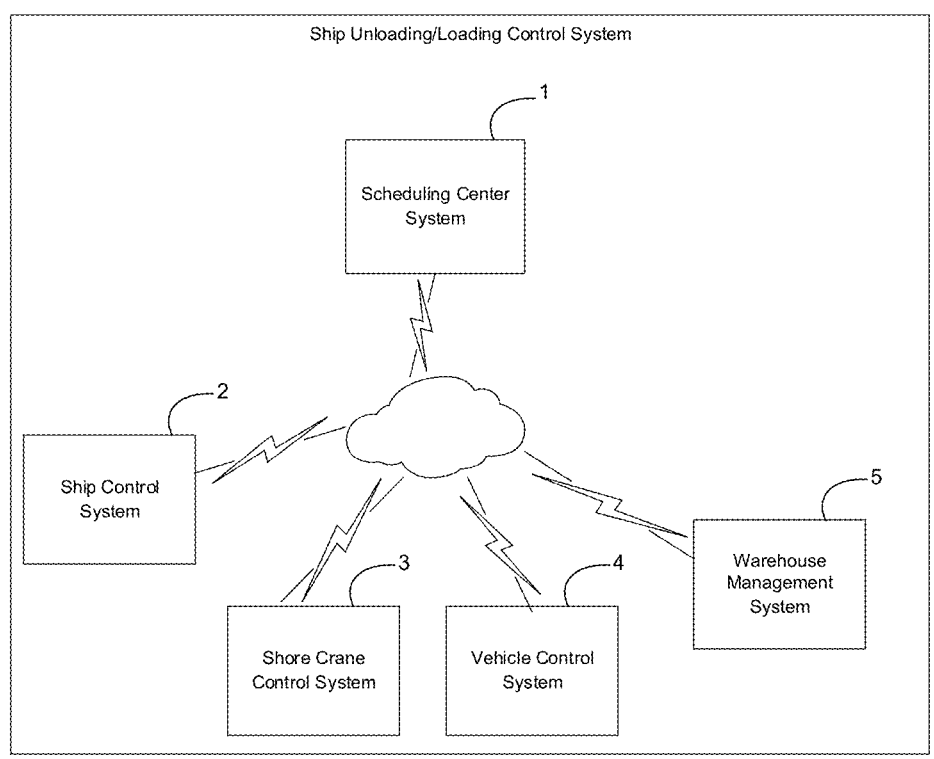
FIG. 2 is a second schematic diagram showing a structure of a ship unloading control system and a ship loading control system according to an embodiment of the present disclosure.

The ship loading control system according to Embodiment 1 of the present disclosure can further include a vehicle control system 4 and a warehouse management system 5, as shown in FIG. 2.

The vehicle control system 4 can be configured to control, upon receiving a container loading task, the transportation vehicle to move to a container loading location associated with the container loading task for loading the container, and to control, upon receiving a container unloading task, the transportation vehicle to move to a container unloading location associated with the container unloading task for unloading the container.

The warehouse management system 5 can be configured to assign, upon receiving a container storage task, a warehouse hoisting apparatus to hoist each target container carried by the transportation vehicle to a corresponding storage location in accordance with the container storage task.

In some optional embodiments, the scheduling center system 1 can be further configured to generate the container storage task based on the ship unloading plan and transmit the container storage task to the warehouse management system 5 of a warehouse center.

In some optional embodiments, the scheduling center system 1 can be further configured to generate the container loading task based on the ship unloading plan and transmit the container loading task to the vehicle control system 4 of the transportation vehicle.

In some optional embodiments, the container storage task can include a container storage task list recording identification information of the warehouse management system, the identification information of each container to be stored in the warehouse center and its corresponding target container area.

In some optional embodiments, the scheduling center system 1 can be further configured to determine, after the shore crane apparatus has loaded the container onto the transportation vehicle, the container unloading location based on the target container area for the container, generate the container unloading task containing the container unloading location and transmit the container unloading task to the vehicle control system 4 of the transportation vehicle.

In some embodiments, in the port area, a container loading location and a container unloading location, which may be one and the same location or two different locations, can be predetermined for each container area. The container loading and unloading locations corresponding to each container area in the port area can be stored in advance in the scheduling center system 1 and/or the shore crane control system 3.

In some optional embodiments, the shore crane control system 3 can obtain its own location information by means of positioning, and exchange information with the ship control system 2 and the vehicle control system 4, so as to obtain the location information of the target ship and the location information of the transportation vehicle, and hoist the container onto the transportation vehicle based on its own location information, the location information of the target ship and the location information of the transportation vehicle.

In an embodiment, the hoisting arm of the shore crane apparatus can be provided with an end effector, and the container can be provided with a grab section coordinated with the end effector. The shore crane apparatus lifts the container by grabbing the grab section of the container with the end effector.

In an embodiment, in a container lifting operation, the shore crane control system 3 can capture an image of the grab section of the container, determine orientation information of the grab section based on the image, and adjust a movement gesture of the end effector based on the orientation information of the grab section, such that the end effector can grab the grab section precisely to lift the container.

In an embodiment of the present disclosure, the hoisting arm can be a hoister. A lock can be provided at each of four corners of a lower part of the hoister (i.e., the four locks constitute the end effector). A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). A buckle or ring can be provided on the top of the container. When the hook of the hoister is hooked to the buckle or ring on the top of the container, the hoister can lift the container.

In some optional embodiments, the shore crane control system 3 can be further configured to establish association information between the transportation vehicle and the container after controlling the target shore crane apparatus to load the container onto the transportation vehicle, and transmit the association information to the scheduling center system 1.

In an embodiment of the present disclosure, in order to guarantee the correspondence between the transportation vehicle and the container it carries, the shore crane control system 3 can associate the transportation vehicle and the container based on identification information of the transportation vehicle and the identification information of the container when loading the container onto the transportation vehicle.

As an implementation of the embodiment of the present disclosure, in the above embodiment, the scheduling center system 1 generating the container unloading task containing the container unloading location based on the target container area for the container may include: the scheduling center system 1 determining, upon receiving the association information between the transportation vehicle and the container from the shore crane control system 3, the container unloading location for the container based on the target container area for the container in the association information and generating the container unloading task containing the container unloading location.

In some optional embodiments, the warehouse management system 5 assigning the warehouse hoisting apparatus to hoist each target container carried by the transportation vehicle to the corresponding storage location in accordance with the container storage task may include: the warehouse management system 5 confirming, upon receiving a container unloading in-position notification message from the vehicle control system 4 of the transportation vehicle, an identity of the container in the container unloading in-position notification message, and transmitting a container unloading hoisting task containing the storage location of the container to a hoisting control system of the warehouse hoisting apparatus when the identity is confirmed; and the warehouse management system 5 marking the container in the container storage task as in a stored state upon receiving the container unloading completion notification message from the hoisting control system of the warehouse hoisting apparatus, and transmitting a container storage task completion notification message to the scheduling center system 1 or the shore crane control system 3 when determining that all containers in the container storage task have been marked as in the stored state.

The hoisting control system of the warehouse hoisting apparatus can lift the container on the transportation vehicle and place it at the storage location associated with the container unloading hoisting task upon receiving the container unloading hoisting task, and transmit a container unloading completion notification message to the warehouse management system 5 and/or the vehicle control system 4 of the transportation vehicle.

In some optional embodiments, the vehicle control system 4 can be further configured to transmit a container loading in-position notification message to the shore crane control system 3 of the shore crane apparatus corresponding to the container loading location when controlling the transportation vehicle to move to the container loading location, and transmit a container unloading in-position notification message to the warehouse management system 5 corresponding to the container unloading location when controlling the transportation vehicle to move to the container unloading location.

In an embodiment of the present disclosure, the vehicle control system 4 can be configured to determine a current location of the transportation vehicle, plan a travel route from the current location of the transportation vehicle to the container loading location or container unloading location based on the container loading task or container unloading task for the transportation vehicle, obtain environment information and determine a perception result, determine travel decision information based on the perception result and the travel route, and control the transportation vehicle to move to the container loading location or container unloading location along the travel route based on the travel decision information.

In an embodiment of the present disclosure, the perception result may include information on e.g., a type, shape, contour, location and distance of an obstacle around the mobile hoisting apparatus. The vehicle control system 4 can obtain the above perception result by recognizing the environment information using any existing visual processing techniques such as object detection, object tracking and semantic segmentation (the present disclosure is not limited thereto). The vehicle control system 4 can plan the travel route from the current location of the transportation vehicle to the container loading location or container unloading location using its own navigation algorithm or any third-party navigation software (the present disclosure is not limited thereto). The travel decision information may include steering information (including information on steering angle), acceleration information (including information on an opening degree of a throttle pedal), deceleration information (including information on an opening degree of a brake pedal), gear information (including information on driving, reverse or neutral gear), and the like. The specific decision algorithm can be similar to the existing decision algorithm used in the self-driving vehicles and details thereof will be omitted here.

In some optional embodiments, when transmitting the container storage task to the warehouse center, the scheduling center system 1 can determine, based on operation time information of each warehouse hoisting apparatus in the warehouse hoisting apparatus information in the port area, at least one warehouse hoisting apparatus that is in the idle state at hoisting time, and select one or more warehouse hoisting apparatuses from the determined at least one warehouse hoisting apparatus for assigning to the warehouse center. The predetermined hoisting time can be the ship unloading start time or the time at which the transportation vehicle is estimated to arrive at the warehouse center. Of course, in some optional embodiments, the warehouse center of the port has a pre-assigned corresponding warehouse hoisting apparatus and there is no need for the scheduling center system 1 to assign the warehouse hoisting apparatus. The warehouse hoisting apparatus has a hoisting control system.

In an embodiment of the present disclosure, the storage area of the warehouse center can be divided into a number of container areas depending on the types of container goods they can store. The containers in each container area are stacked in layers per column. The container storage task transmitted from the scheduling center system 1 to the warehouse management system 5 of the warehouse center may contain the identification information of the container and the target container area for the container. Upon receiving the container unloading in-position notification message from the vehicle control system 4 of the transportation vehicle, the warehouse management system 5 can compare the identification information of the container in the container unloading in-position notification message with the identification information of the container in the container storage task, and determine that the identity is confirmed when they match each other. In this case, the warehouse management system 5 can confirm the storage location of the container from available storage locations in the target container area based on the target container area for the container in the container storage task, generate the container unloading hoisting task containing the storage location of the container, and transmit the container unloading hoisting task to the hoisting control system of the warehouse hoisting apparatus. If they do not match, no further operation is performed and a warning message of leaving or wrong container area can be transmitted to the vehicle control system 4 of the transportation vehicle.

In an embodiment, the hoisting control system 3 can determine its own location information by means of positioning, communicate with the warehouse management system 5 and the vehicle control system 4 to obtain the storage location information of the container and the location information of the transportation vehicle, and hoist the container on the transportation vehicle to the storage location of the container based on its own location information, the storage location information of the container and the location information of the transportation vehicle.

In an embodiment, the warehouse hoisting apparatus can be a rubber-tired gantry crane, a rail-mounted gantry crane or a forklift. The warehouse hoisting apparatus is provided with a hoisting arm, which can be a mechanical arm or a hoister (the present disclosure is not limited thereto). In an embodiment, the hoisting arm of the warehouse hoisting apparatus may have a specific structure similar to the hoisting arm of the shore crane apparatus. For the lifting operation process for the warehouse hoisting apparatus to lift the container, reference can be made to the lifting operation process for the shore crane apparatus and details thereof will be omitted here.

In some optional embodiments, the container storage task in the above embodiment can be generated by the shore crane control system 3 based on the ship unloading task and transmitted to the warehouse management system 5 of the warehouse center.

In some optional embodiments, the container loading task in the above embodiment can be generated by the shore crane control system 3 based on the ship unloading task and transmitted to the vehicle control system 4 of the transportation vehicle.

In some optional embodiments, the shore crane control system 3 can generate the container unloading task containing the container unloading location based on the target container area for the container after controlling the target shore crane apparatus to load the container onto the transportation vehicle, and transmit the container unloading task to the vehicle control system 4 of the transportation vehicle.

In an embodiment of the present disclosure, a warehouse management system 5 can manage one or more container areas. If the target container areas for the containers in the ship unloading plan are distributed across a plurality of warehouse management systems, the scheduling center system 1 can generate a plurality of container storage tasks based on the ship unloading plan and transmit them to the respective warehouse management systems 5. Assuming that one warehouse management system 5 manages one container area and the target container areas for a number, N, of containers in a ship unloading plan are distributed over Container Area A, Container Area B, Container Area C and Container Area D managed by Warehouse Management Systems A-D, respectively, the scheduling center system 1 can generate four container storage tasks, with the containers in each container storage task having the same target container area, and transmit the four container storage tasks to Warehouse Management Systems A-D, respectively.

In an embodiment, the remote communication between the scheduling center system 1 and the ship control system 2 of the target ship can be performed by means of satellite communication. For the implementation of the satellite communication between the ship control system 2 and the scheduling center system 1, reference can be made to the existing satellite communication technology and details thereof will be omitted here. Within the wireless signal coverage of the port, the scheduling center system 1, the shore crane control system 3 of the target shore crane apparatus, the warehouse management systems 5 of the warehouse center and the vehicle control system 4 of the transportation vehicle can communicate with each other by means of wireless communication. The wireless communication can be Narrow Band Internet of Things (NB-IoT), 4G, WIFI, Zigbee or the like, and the present disclosure is not limited thereto.

Figure 3:
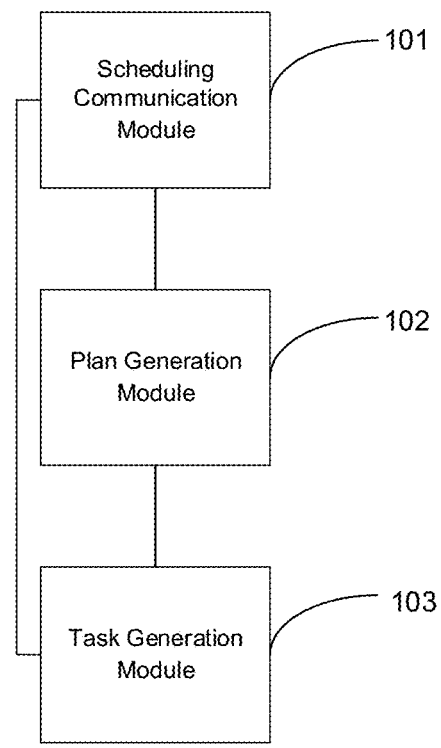
FIG. 3 is a schematic diagram showing a structure of a scheduling center system according to an embodiment of the present disclosure.

Based on the same inventive concept, according to an embodiment of the present disclosure, a scheduling center system 1 is provided. Referring to FIG. 3, the scheduling center system 1 includes at least one machine executable instruction. The at least one machine executable instruction includes a scheduling communication module 101, a plan generation module 102 and a task generation module 103. The at least one machine executable instruction is executed by a processor such that: the scheduling communication module 101 is configured to transmit and receive information, the plan generation module 102 is configured to generate a ship unloading plan based on ship information and container information of a target ship and shore crane apparatus information as received by the scheduling communication module 101, and the task generation module 103 is configured to generate a ship berthing task and a ship unloading task based on the ship unloading plan, and transmit the ship berthing task and the ship unloading task to a ship control system of the target ship and a shore crane control system of a target shore crane apparatus, respectively, via the scheduling communication module 101 (the scheduling communication module 101 transmits the ship berthing task to the ship control system of the target ship and transmits the ship unloading task to the shore crane control system of the target shore crane apparatus).

In some optional embodiments, the scheduling communication module 101 can transmit and receive information using any of various communication protocols. The transmitted or received information can be transmitted or received via an antenna or transceiver coupled to the communication module 101.

In some optional embodiments, the task generation module 103 can be further configured to generate a container storage task based on the ship unloading plan and transmit the container storage task to a warehouse management system 5 of a warehouse center via the scheduling communication module 101.

In some optional embodiments, the task generation module 103 can be further configured to generate a container loading task based on the ship unloading plan and transmit the container loading task to a vehicle control system of a corresponding transportation vehicle via the scheduling communication module 101, and, upon receiving association information between the transportation vehicle and a container via the scheduling communication module 101, generate a container unloading task containing a container unloading location based on a target container area for the container and transmit the container unloading task to the vehicle control system of the transportation vehicle in the association information via the scheduling communication module 101.

Based on the same application concept, according to an embodiment of the present disclosure, a scheduling center system 1 is provided. The scheduling center system 1 includes at least one processor and at least one memory. The at least one memory stores at least one machine executable instruction executable by the at least one processor. The at least one machine executable instruction includes the modules shown in FIG. 3. The at least one machine executable instruction can also provide modules for functions such as an operating system and a human-machine interaction interface. The at least one processor executes the at least one machine executable instruction to implement the above described operations, processes and functions of the scheduling center system 1 as shown in FIG. 1. The scheduling center system 1 according to the embodiment of the present disclosure can be provided at a specified location in a port, e.g., at a central control center or a centralized control center. The control center can further include other control systems or scheduling systems and can communicate with other external management systems, e.g., a customs management system. The scheduling center system 1 according to the embodiment of the present disclosure can also communicate with the other systems in the control center and/or the external management systems.

Figure 4:
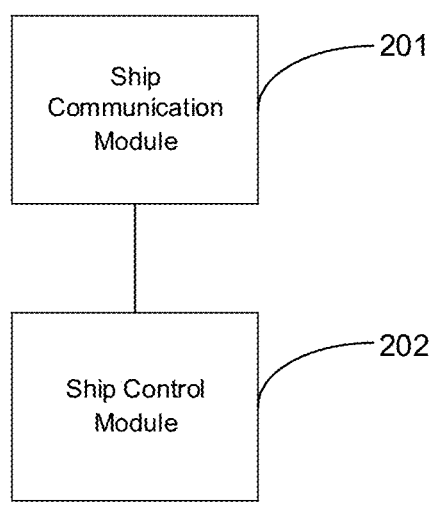
FIG. 4 is a schematic diagram showing a structure of a ship control system according to an embodiment of the present disclosure.

Based on the same inventive concept, according to an embodiment of the present disclosure, a ship control system 2 is provided. Referring to FIG. 4, the ship control system 2 includes at least one machine executable instruction. The at least one machine executable instruction includes a ship communication module 201 and a ship control module 202. The at least one machine executable instruction is executed by a processor such that: the ship communication module 201 is configured to transmit and receive information, and the ship control module 202 is configured to transmit ship information and container information to a scheduling center system via the ship communication module 201, and upon receiving a ship berthing task from the scheduling center system via the ship communication module 201, control a target ship to move to an operation area corresponding to a target shore crane apparatus, and transmit a ship in-position notification message to a shore crane control system of the target shore crane apparatus via the ship communication module 201.

In some optional embodiments, the ship communication module 201 can transmit and receive information using any of various communication protocols. The transmitted or received information can be transmitted or received via an antenna or transceiver coupled to the communication module 201.

Based on the same application concept, according to an embodiment of the present disclosure, a ship control system 2 is provided. The ship control system 2 includes at least one processor and at least one memory. The at least one memory stores at least one machine executable instruction executable by the at least one processor. The at least one machine executable instruction includes the modules shown in FIG. 4. The at least one machine executable instruction can also provide modules for functions such as an operating system and a human-machine interaction interface. The at least one processor executes the at least one machine executable instruction to implement the above described operations, processes and functions of the ship control system 2 as shown in FIG. 1.

Based on the same inventive concept, according to an embodiment of the present disclosure, a ship is provided. The ship includes the ship control system 2 according to the above embodiment.

Figure 5:
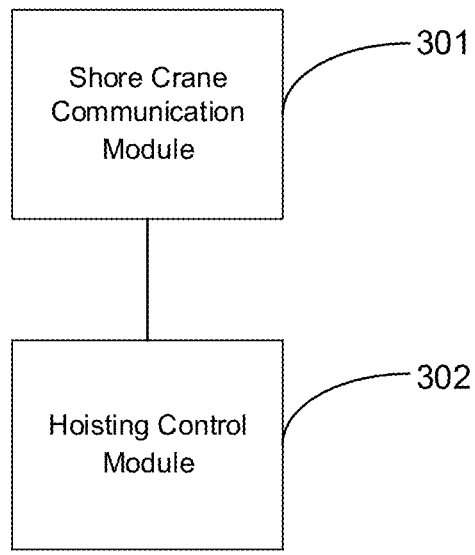
FIG. 5 is a first schematic diagram showing a structure of a shore crane control system according to an embodiment of the present disclosure.

Based on the same inventive concept, according to an embodiment of the present disclosure, a shore crane control system 3 is provided. Referring to FIG. 5, the shore crane control system 3 includes at least one machine executable instruction. The at least one machine executable instruction includes a shore crane communication module 301 and a hoisting control module 302. The at least one machine executable instruction is executed by a processor such that: the shore crane communication module 301 is configured to transmit and receive information, and the hoisting control module 302 is configured to receive a ship unloading task from a scheduling center system 1 via the shore crane communication module 301, and upon receiving a ship in-position notification message from a ship control system via the shore crane communication module 301, control a target shore crane apparatus to load a container on a target ship onto a transportation vehicle in accordance with the ship unloading task.

In some optional embodiments, the shore crane communication module 301 can transmit and receive information using any of various communication protocols. The transmitted or received information can be transmitted or received via an antenna or transceiver coupled to the communication module 301.

Figure 6:
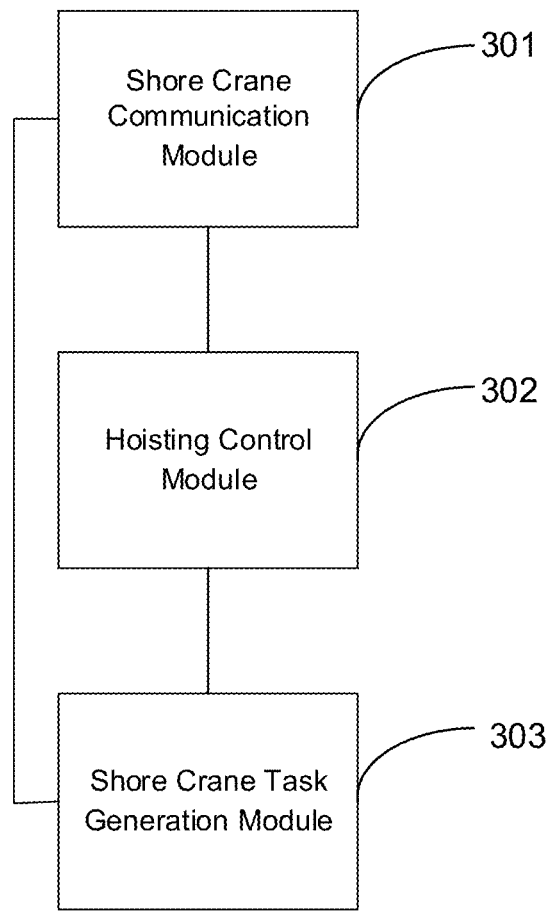
FIG. 6 is a second schematic diagram showing a structure of a shore crane control system according to an embodiment of the present disclosure.

In some optional embodiments, referring to FIG. 6, the shore crane control system 3 can further include a shore crane task generation module 303 configured to generate a container storage task based on the ship unloading task and transmit the container storage task to a warehouse management system 5 of a warehouse center via the shore crane communication module 301.

In some optional embodiments, the hoisting control module 302 controlling the target shore crane apparatus to load the container on the target ship onto the transportation vehicle in accordance with the ship unloading task may include: confirming an identity of the container on the target ship and controlling the target shore crane apparatus to hoist the container when the identity is confirmed; and controlling the target shore crane apparatus to load the container onto the transportation vehicle upon receiving a vehicle in-position notification message from a vehicle control system of the transportation vehicle via the shore crane communication module 301.

In some optional embodiments, the hoisting control module 302 can be further configured to establish association information between the transportation vehicle and the container after controlling the target shore crane apparatus to load the container onto the transportation vehicle.

In some optional embodiments, the hoisting control module 302 can be further configured to transmit the association information to the scheduling center system 1 via the shore crane communication module 301.

In some optional embodiments, the shore crane task generation module 303 can be further configured to generate a container loading task based on the ship unloading task and transmit the container loading task to a vehicle control system 4 of the transportation vehicle via the shore crane communication module 301, and after controlling the target shore crane apparatus to load the container onto the transportation vehicle, generate a container unloading task containing a container unloading location based on a target container area for the container and transmit the container unloading task to the vehicle control system 4 of the transportation vehicle via the shore crane communication module 301.

Based on the same application concept, according to an embodiment of the present disclosure, a shore crane control system 3 is provided. The shore crane control system 3 includes at least one processor and at least one memory. The at least one memory stores at least one machine executable instruction executable by the at least one processor. The at least one machine executable instruction includes the modules shown in FIG. 5 or 6. The at least one machine executable instruction can also provide modules for functions such as an operating system and a human-machine interaction interface. The at least one processor executes the at least one machine executable instruction to implement the above described operations, processes and functions of the shore crane control system 3 as shown in FIG. 1.

Based on the same inventive concept, according to an embodiment of the present disclosure, a shore crane apparatus is provided. The shore crane apparatus includes the shore crane control system 3 according to the above embodiment.

Figure 7:
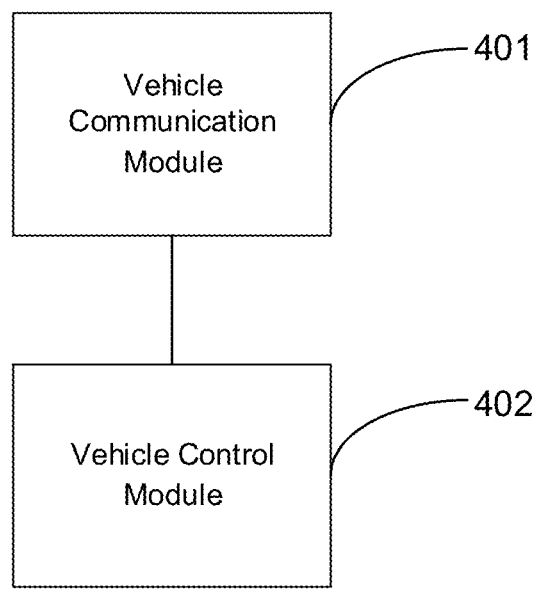
FIG. 7 is a schematic diagram showing a structure of a vehicle control system according to an embodiment of the present disclosure.

Based on the same inventive concept, according to an embodiment of the present disclosure, a vehicle control system 4 is provided. Referring to FIG. 7, the vehicle control system 4 includes at least one machine executable instruction. The at least one machine executable instruction includes a vehicle communication module 401 and a vehicle control module 402. The at least one machine executable instruction is executed by a processor such that: the vehicle communication module 401 is configured to transmit and receive information, and the vehicle control module 402 is configured to control, upon receiving a container loading task via the vehicle communication module 401, a transportation vehicle to move to a container loading location associated with the container loading task for loading a container in accordance with the container loading task, and to control, upon receiving a container unloading task via the vehicle communication module 401, the transportation vehicle to move to a container unloading location associated with the container unloading task for unloading a container in accordance with the container unloading task.

In some optional embodiments, the vehicle communication module 401 can transmit and receive information using any of various communication protocols. The transmitted or received information can be transmitted or received via an antenna or transceiver coupled to the communication module 401.

Based on the same application concept, according to an embodiment of the present disclosure, a vehicle control system 4 is provided. The vehicle control system 4 includes at least one processor and at least one memory. The at least one memory stores at least one machine executable instruction executable by the at least one processor. The at least one machine executable instruction includes the modules shown in FIG. 6. The at least one machine executable instruction can also provide modules for functions such as an operating system and a human-machine interaction interface. The at least one processor executes the at least one machine executable instruction to implement the above described operations, processes and functions of the vehicle control system 4 as shown in FIG. 1.

Based on the same application concept, according to an embodiment of the present disclosure, a transportation vehicle is provided. The transportation vehicle includes the vehicle control system 4 according to the above embodiment. The transportation vehicle may further include other sensor systems, vehicle networking systems and control systems. The vehicle control system 4 can communicate with these systems so as to enable efficient navigation and safe travel of the vehicle.

Embodiment 2

According to Embodiment 2 of the present disclosure, a ship loading control system is provided. Referring to FIG. 1, the ship loading control system includes: a scheduling center system 1 configured to determine a ship loading plan based on ship information, container information, and shore crane apparatus information, generate a ship berthing task and a ship loading task based on the ship loading plan, and transmit the ship berthing task and the ship loading task to a ship control system 2 of a target ship and a shore crane control system 3 of a target shore crane apparatus, respectively (i.e., the scheduling center system 1 transmits the ship berthing task to the ship control system 2 of the target ship and transmits the ship loading task to the shore crane control system 3 of the target shore crane apparatus); the ship control system 2 configured to control, upon receiving the ship berthing task, the target ship to move to an operation area corresponding to the target shore crane apparatus, and transmit a ship in-position notification message to the shore crane control system of the target shore crane apparatus; and the shore crane control system 3 configured to control, upon receiving the ship in-position notification message from the ship control system, the target shore crane apparatus to load a container on a transportation vehicle onto the target ship in accordance with the received ship loading task.

In an embodiment, the shore crane control system 3 can be further configured to: confirm, upon receiving a vehicle in-position notification message from a vehicle control system of the transportation vehicle, identification information of the container on the transportation vehicle, control the target shore crane apparatus to load the container on the transportation vehicle onto the target ship when the identification information is confirmed, and mark the container in the ship loading task as in a loaded state; and transmit a ship loading completion notification message to the scheduling center system 1 and/or the ship control system 2 of the target ship when determining that all containers in the ship loading task have been marked as in the loaded state.

In particular, the containers on the target ship can be arranged in columns, with multiple containers being stacked in layers in each column. Upon receiving the vehicle in-position notification message from the vehicle control system 4, the shore crane control system 3 can compare the container information in the ship loading task with the identification information of the container carried by the transportation vehicle, and when they match each other, determine that the identification information of the container carried by the transportation vehicle is confirmed, control the target shore crane apparatus to load the container on the transportation vehicle onto the target ship, and mark the container in the ship loading task as in the loaded state.

In some optional embodiments, a tag containing the identification information of the container can be provided at the surface of the container. For example, the tag can be a Quick Response (QR) code or a barcode, and the shore crane control system 3 can confirm the identity of the container on the transportation vehicle by recognizing the QR code or barcode on the container.

In an embodiment, the shore crane control system 3 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoisting arm of the target shore crane apparatus and can obtain the identification information of the container by scanning the QR code or barcode on the container, compare the identification information of the container with the identification information of the container in the ship loading task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the ship loading task, and determining that the identity is confirmed when they match each other, or otherwise determining that the confirmation of the identity fails.

In an embodiment, when the shore crane control system 3 is controlling the shore crane apparatus to hoist the containers onto the target ship, the containers to be loaded onto the target ship can be loaded by columns and stacked layer by layer per column (the containers are loaded one column of container loading areas after another).

In an embodiment of the present disclosure, when the containers are loaded onto the target ship for transportation, the target ship can be divided into a plurality of areas depending on different destination ports, with the containers in each area corresponding to the same destination port. In this way, when the ship arrives at a port, a shore crane apparatus at the port can unload the containers in the corresponding area, so as to reduce the workload of hoisting operations when they arrive at their destinations and improve the operation efficiency.

In some optional embodiments, the ship information may include ship arrival time and ship state information. The shore crane apparatus information may include operation time information of each shore crane apparatus in a port area. The container information may include a number of containers and identification information and destination information of each container. The scheduling center system 1 generating the ship loading plan based on the ship information, the container information, and the shore crane apparatus information may include: determining a storage location of each container based on the identification information of the container; determining a target ship based on the number of containers, the destination information of each container, the ship arrival time and ship state information of each ship in the ship information; determining the target shore crane apparatus based on the ship arrival time of the target ship and the operation time information of each shore crane apparatus in the shore crane apparatus information; estimating ship loading start time and ship loading end time based on the ship arrival time of the target ship, the operation time information of the target shore crane apparatus and the number of containers, and generating the ship loading plan containing identification information of the target ship, identification information of the target shore crane apparatus, the ship loading start time, the ship loading end time and the identification information and the storage location for each container.

In an embodiment, the ship loading start time can be determined by: determining whether the target shore crane apparatus is in an idle state at the ship arrival time based on the operation time of the target shore crane apparatus; and if so, determining the ship arrival time or the time at which the ship has arrived and berthed as the ship loading start time, or otherwise determining the time at which the target shore crane apparatus completes the task it is performing at the ship arrival time as the ship loading start time.

In an embodiment, the ship loading end time can be determined by: calculating a time length required for the target shore crane apparatus to load the container onto the target ship based on a historical operation rate of the target shore crane apparatus; and obtaining the ship loading end time based on the ship loading start time and the time length.

In some optional embodiments, the ship loading plan may contain the ship loading start time, the ship loading end time, the identification information of the target shore crane apparatus, the container unloading location corresponding to the target shore crane apparatus, the identification information of the target ship, the identification information of the warehouse management system, the identification information of the transportation vehicle, and the identification information and the storage location for each container.

The scheduling center system 1 generating the container transportation task and the container distribution task based on the ship loading plan may include: the scheduling center system 1 generating the container transportation task containing the container loading location and the container unloading location, and generating the container distribution task containing the ship loading start time, the ship loading end time, the identification information of the target shore crane apparatus, the identification information of the target ship, the identification information of the warehouse management system, and the identification information and the storage location for each container.

As an implementation of the embodiment of the present disclosure, the ship state information may include tonnage information of each ship and a travel route of each ship. The scheduling center system 1 can select ships satisfying a container transportation requirement based on the destination information of the containers and the travel route of each ship, and select, as the target ship, a ship satisfying a container loading requirement from the ships satisfying the container transportation requirement based on the number of containers and the identification information of each container and the tonnage information of the ships.

As an implementation of the embodiment of the present disclosure, the scheduling center system 1 determining the target shore crane apparatus based on the ship arrival time of the target ship and the operation time information of each shore crane apparatus in the shore crane apparatus information may include: determining one or more shore crane apparatuses available at the ship arrival time based on the ship arrival time of the target ship and the operation time information of each shore crane apparatus; and selecting one of the determined one or more shore crane apparatuses as the target shore crane apparatus. The available shore crane apparatus may refer to a shore crane apparatus that is in an idle state at the arrival time, or a shore crane apparatus that is about to complete its operation at the arrival time.

As an implementation of the embodiment of the present disclosure, when determining the target shore crane apparatus based on the ship arrival time and the operation time information of each shore crane apparatus in the shore crane apparatus information, if the operation area of the target ship is enough for two or more shore crane apparatuses to perform hoisting operations, the scheduling center system 1 can select two or more of the shore crane apparatuses in the idle state based on size information and the operation area of the ship, as target shore crane apparatuses. In the ship loading operation, different target shore crane apparatuses can hoist containers within their respective operation ranges in accordance with the ship loading task and load the containers onto the target ship, so as to shorten the operation time and improve the operation efficiency.

As an implementation of the embodiment of the present disclosure, during the ship loading process, if the currently determined target shore crane apparatus cannot meet a container hoisting requirement, e.g., when the currently determined target shore crane apparatus malfunctions during the hoisting operation, the scheduling center system 1 can reselect another available hoisting apparatus as a new target shore crane apparatus based on current time information and the operation time information of each shore crane apparatus in the shore crane apparatus information.

In some optional embodiments, the scheduling center system 1 generating the ship berthing task, the ship loading task, and the container distribution task based on the ship loading plan may include: generating the ship berthing task containing identification information and an operation area of the target shore crane apparatus, based on the ship loading plan; generating the ship loading task containing identification information of the target ship, ship loading start time, ship loading end time and identification information of each container based on the ship loading plan; and generating the container distribution task containing identification information of the identification information of the target shore crane apparatus, ship loading start time, ship loading end time and identification information and storage location of each container based on the ship loading plan.

In some optional embodiments, the ship control system 2 can be further configured to: determine a travel time length from a current location of the ship to the port based on the current location, a location of the port and a travel route; estimating arrival time at which the target ship arrives at the port based on the travel time length and current time; and transmitting the ship information containing the estimated arrival time and ship state information to the scheduling center system 1.

In this embodiment, the scheme for obtaining the arrival time of the ship can be similar to that for obtaining the arrival time of the target ship as described above in connection with Embodiment 1, and details thereof will be omitted here.

In an embodiment, when the target ship approaches the area where the target shore crane apparatus is located, the ship control system can control the target ship to move to the operation area of the target shore crane apparatus in accordance with the received ship berthing task containing the identification information and operation area of the target shore crane apparatus. When the target ship is in position, the ship control system can transmit the ship in-position notification message to the shore crane control system of the target shore crane apparatus and wait for the ship loading operation.

Referring to FIG. 2, the ship loading control system according to Embodiment 2 of the present disclosure can further include a vehicle control system 4 provided at the transportation vehicle and a warehouse management system 5.

The vehicle control system 4 is configured to control, upon receiving a container transportation task, the transportation vehicle to move to a container loading location associated with the container transportation task for loading the container, and to control, when completing the loading of the container, the transportation vehicle to move to a container unloading location associated with the container transportation task for unloading the container.

The warehouse management system 5 is configured to assign, upon receiving the container distribution task, a warehouse hoisting apparatus to hoist a target container in the container distribution task onto the transportation vehicle.

In an embodiment of the present disclosure, a warehouse management system can manage one or more container areas. If the container areas in which the storages locations of the containers in the ship loading plan are located are distributed across a plurality of warehouse management systems, the scheduling center system can generate a plurality of container distribution tasks based on the ship loading plan and transmit them to the respective warehouse management systems. Assuming that one warehouse management system manages one container area and the container areas corresponding to the storages locations of a number, M, of containers in a ship loading plan are distributed over Container Area A, Container Area B, Container Area C and Container Area D managed by Warehouse Management Systems A-D, respectively, the scheduling center system can generate four container distribution tasks, with the containers in each container distribution task having the same target container area, and transmit the four container distribution tasks to Warehouse Management Systems A-D, respectively.

In an optional embodiment, the scheduling center system 1 can be further configured to generate the container transportation task based on the ship loading plan and transmit the container transportation task to the vehicle control system 4 of the transportation vehicle.

In an optional embodiment, the shore crane control system 3 can be further configured to generate the container transportation task based on the ship loading task and transmit the container transportation task to the vehicle control system 4 of the transportation vehicle.

In an optional embodiment, the warehouse management system 5 can be further configured to generate the container transportation task based on the container distribution task and transmit the container transportation task to the vehicle control system 4 of the transportation vehicle.

In an embodiment, the shore crane control system 3 can obtain its own location information by means of positioning, and exchange information with the ship control system and the vehicle control system, so as to obtain the location information of the target ship and the location information of the transportation vehicle, and hoist the container onto the target ship based on its own location information, the location information of the target ship and the location information of the transportation vehicle.

In some optional embodiments, the warehouse management system 5 assigning the warehouse hoisting apparatus to hoist the target container in the container distribution task onto the transportation vehicle may include: the warehouse management system 5 transmitting a container loading hoisting task containing a storage location of the container to a hoisting control system of the warehouse hoisting apparatus based on a target container area for each container in the container distribution task; and the warehouse management system 5 marking the container in the container distribution task as in a distributed state upon receiving a container loading completion notification message from the hoisting control system of the warehouse hoisting apparatus, and transmitting a container distribution task completion notification message to the scheduling center system 1 when determining that all containers in the container distribution task have been marked as in the distributed state.

Upon receiving the container loading hoisting task, the hoisting control system of the warehouse hoisting apparatus can control the warehouse hoisting apparatus to lift the container at the storage location in the container loading hoisting task, load the container onto the transportation vehicle upon receiving a transportation vehicle in-position notification message, and transmit a container loading completion notification message to the warehouse management system 5 and/or the vehicle control system 4 of the transportation vehicle.

In some optional embodiments, a tag containing the identification information of the container can be provided at the surface of the container. For example, the tag can be a Quick Response (QR) code or a barcode, and the warehouse management system can confirm the identity of the container at the storage location by recognizing the QR code or barcode on the container.

In an embodiment, the warehouse management system can include an identity recognition device, which can be a camera, a code reader or any other device capable of recognizing a QR code or barcode (the present disclosure is not limited thereto). As an implementation of the embodiment of the present disclosure, the identity recognition device can be provided on a hoister of the warehouse hoisting apparatus and can obtain the identification information of the container by scanning the QR code or barcode on the container, compare the identification information of the container with the identification information of the container in the container distribution task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the container distribution task, and determining that the identity is confirmed when they match each other, or otherwise determining that the confirmation of the identity fails.

In some optional embodiments, the vehicle control system 4 can be further configured to transmit a container loading in-position notification message to the warehouse management system 5 corresponding to the container loading location when controlling the transportation vehicle to move to the container loading location in the container transportation task. The warehouse management system 5 can transmit a transportation vehicle in-position notification message to the hoisting control system of the warehouse hoisting apparatus.

In some optional embodiments, the vehicle control system 4 can be further configured to transmit a container loading in-position notification message to the warehouse management system 5 corresponding to the container loading location when controlling the transportation vehicle to move to the container loading location in the container transportation task. The warehouse management system 5 can transmit the identification information of the warehouse hoisting apparatus to the vehicle control system 4. The vehicle control system 4 can transmit a transportation vehicle in-position notification message to the hoisting control system of the warehouse hoisting apparatus.

In some optional embodiments, the vehicle control system 4 can be further configured to transmit a transportation vehicle in-position notification message to the hoisting control system of the warehouse hoisting apparatus when controlling the transportation vehicle to move to the container loading location in the container transportation task.

In some optional embodiments, the vehicle control system 4 can be further configured to transmit a container unloading in-position notification message to the shore crane control system 3 of the shore crane apparatus corresponding to the container unloading location when controlling the transportation vehicle to move to the container unloading location associated with the container transportation task.

In some optional embodiments, the vehicle control system 4 can be further configured to transmit a container loading in-position notification message to the warehouse management system 5 corresponding to the container loading location when controlling the transportation vehicle to move to the container loading location, and transmit a container unloading in-position notification message to the shore crane control system 3 of the target shore crane apparatus corresponding to the container unloading location when controlling the transportation vehicle to move to the container unloading location.

In an embodiment of the present disclosure, the vehicle control system 4 can be configured to determine a current location of the transportation vehicle, plan a first travel route from the current location of the transportation vehicle to the container loading location and control the transportation vehicle to move to the container loading location for loading the container, or plan a second travel route from the container loading location to the container unloading location and control the transportation vehicle to move to the container unloading location for unloading the container, based on the container transportation task for the transportation vehicle. While the transportation vehicle is moving, environment information can be obtained and a perception result can be determined. Travel decision information can be determined based on the perception result and the travel route. The transportation vehicle can be controlled to move to the container loading location or container unloading location along the travel route based on the travel decision information.

In an embodiment of the present disclosure, the storage area of the warehouse center can be divided into a number of container areas depending on the types of container goods they can store. The containers in each container area are stacked in layers per column. The container distribution task transmitted from the scheduling center system 1 to the warehouse management system 5 of the warehouse center may contain the identification information of the container and the storage location of the container.

In an embodiment, the hoisting control system of the warehouse hoisting apparatus can determine its own location information by means of positioning, exchange information with the warehouse management system 5 and the vehicle control system 4 to obtain the storage location information of the container and the location information of the transportation vehicle, and hoist the container on the transportation vehicle to the storage location of the container, or lift and load the container at the container storage location onto the transportation vehicle, based on its own location information, the storage location information of the container and the location information of the transportation vehicle.

In an embodiment, the warehouse hoisting apparatus can be a rubber-tired gantry crane, a rail-mounted gantry crane or a forklift. The warehouse hoisting apparatus is provided with a hoisting arm, which can be a mechanical arm or a hoister (the present disclosure is not limited thereto). In an embodiment, the hoisting arm of the warehouse hoisting apparatus may have a specific structure similar to the hoisting arm of the shore crane apparatus. For the lifting operation process for the warehouse hoisting apparatus to lift the container, reference can be made to the lifting operation process for the shore crane apparatus and details thereof will be omitted here.

In some optional embodiments, the container transportation task in the above embodiment can be generated by the shore crane control system 3 based on the ship loading task and transmitted to the vehicle control system 4 of the transportation vehicle.

In some optional embodiments, the container transportation task in the above embodiment can be generated by the warehouse management system 5 based on the container distribution task and transmitted to the vehicle control system 4 of the transportation vehicle.

Unless stated otherwise specifically, terms such as processing, calculating, operating, determining, displaying and the like may refer to an action and/or procedure performed by one or more processing or computing systems or similar devices. The action and/or procedure can be represented as a data operation on a physical (e.g., electronic) quantity in a register or memory of a processing system or a conversion into other data similarly represented as a physical quantity in a memory or register of a processing system or any other similar information storage, transmission or display device. Information or signals can be represented using any of various different techniques and methods. For example, the data, instructions, commands, information, signals, bits, symbols and chips mentioned throughout the above description can be represented using voltages, currents, electromagnetic waves, magnetic fields or particles, optical fields or particles, or any combination thereof.

It should be noted that any particular order or hierarchy of the steps in the disclosed process is only an example of an exemplary method. It can be appreciated that, depending on design preferences, the particular order or hierarchy of the steps in the disclosed process can be re-arranged without departing from the scope of the present disclosure. The method claims as attached show elements of the respective steps in an exemplary order, but they are not limited to the particular order or hierarchy as described.

In the above detailed description, various features may be combined together in one single embodiment for simplicity. However, such disclosure should not be interpreted as reflecting an intent that the implementation of the claimed subject matter requires more features than those clearly defined in each claim. Rather, as reflected by the claims as attached, the present disclosure may be in a state having less than all features of the one single embodiment as disclosed. Therefore, the claims are hereby explicitly incorporated into the detailed description and each claim individually constitutes a separate preferred embodiment of the present disclosure.

It can be appreciated by those skilled in the art that various illustrative logic blocks, modules, circuits and algorithm steps described in connection with the embodiments of the present disclosure can be implemented as electronic hardware, computer software or any combination thereof. In order to clearly illustrate the interchangeability between the hardware and the software, the illustrative components, blocks, modules, circuits and steps have been described above generally with respect to their functions. Depending on specific applications and design constraints applied to the entire system, the functions can be implemented in either hardware or software. For each specific application, those skilled in the art can implement the described function flexibly. However, such implementation decision should not be interpreted as departing from the scope of the present disclosure.

The steps of the methods or algorithms described in connection with the embodiments of the present disclosure can be embodied directly as hardware, software modules executable by processors or any combination thereof. The software modules can be provided in a RAM, a flash memory, a ROM, an EPROM, an EEPROM, a register, a hard drive, a removable magnetic drive, a CD-ROM or any other form of storage medium known in the art. An exemplary storage medium is connected to a processor, such that the processor can read information from the storage medium or write information into the storage medium. Of course, the storage medium can alternatively be a component of the processor. The processor and the storage medium can be provided in an ASIC. The ASIC can be in a user terminal. Of course, the processor and the storage medium can be provided as separate components in a user terminal.

For software implementations, the technique described in the present disclosure can be implemented using modules (e.g., processes, functions or the like) performing the functions described in the present disclosure. These software codes can be stored in a memory unit and executed by a processor. The memory unit can be provided within the processor or externally to the processor. In the latter case, it can be communicatively coupled to the processor in various ways known in the art.

The above description includes examples of one or more embodiments. Of course, it would be impossible to describe all possible combinations of components or methods in order to describe the above embodiments. However, it can be appreciated by those skilled in the art that the embodiments can be further combined and arranged. Thus, the embodiments described herein are intended to cover all such changes, modifications and variants that fall within the scope of the claims as attached. Further, the term "including" as used in the description or claims has a coverage similar to that of the term "comprising" when used in the claims as a transition word. Moreover, any term "or" as used in the claims or description is to be interpreted as "or in a non-exclusive sense".

What is claimed is:

1. A ship unloading control system, comprising:
    a scheduling center system located in a port area with one or more crane apparatus, the scheduling center system configured to:
        generate a ship unloading plan based on ship information and container information of a target ship and shore crane apparatus information, the target ship transporting one or more containers,
        generate a ship berthing task and a ship unloading task based on the ship unloading plan, and
        transmit, using an antenna or transceiver coupled to a first communication module of the scheduling center system, the ship berthing task and the ship unloading task to a ship control system of the target ship and a shore crane control system of a target shore crane apparatus, respectively;
    the ship control system provided on the target ship, the ship control system configured to:
        after entering a wireless signal coverage area of the port area, establish communication with the shore crane control system of the target shore crane apparatus wirelessly based on identification information of the target shore crane apparatus received from the scheduling center system,
        transmit, using an antenna or transceiver coupled to a second communication module of the ship control system, the ship information and the container information to the scheduling center system, control the target ship to move to an operation area corresponding to the target shore crane apparatus in accordance with the received ship berthing task, and transmit, using the antenna or transceiver coupled to the second communication module, a ship in-position notification message to the shore crane control system of the target shore crane apparatus; and the shore crane control system configured to control, upon receiving, by an antenna or transceiver coupled to a communication module of the shore crane control system, the ship in-position notification message from the ship control system, the target shore crane apparatus to load a targeted container on the target ship onto a transportation vehicle in accordance with the ship unloading task, wherein, the shore crane control system comprises an identity recognition device, the identity recognition device being provided on a hoisting arm of the target shore crane apparatus and configured to scan a QR code or a barcode on the targeted container.

2. The ship unloading control system of claim 1, wherein:
the ship information comprises ship arrival time and ship state information,
the shore crane apparatus information comprises operation time information of each of the one or more shore crane apparatus in a port area,
the container information comprises a number of containers transported by the target ship and identification information and a type of goods carried by each container transported by the target ship, and
the scheduling center system being configured to generate the ship unloading plan based on the ship information and container information of the target ship and the shore crane apparatus information comprises the scheduling center system being configured to:
determine the target shore crane apparatus based on the ship arrival time and the operation time information of each of the one or more shore crane apparatus in the shore crane apparatus information;
estimate ship unloading start time and ship unloading end time based on the ship arrival time, the operation time information of the target shore crane apparatus and the number of containers transported by the target ship, and determine a target container area for each container transported by the target ship based on the type of goods carried by the container and information on container areas in the port area; and
generate the ship unloading plan containing:
identification information of the target ship,
identification information of the target shore crane apparatus,
the ship unloading start time,
the ship unloading end time, and
the identification information for each container transported by the target ship and the target container area for each container transported by the target ship.

3. The ship unloading control system of claim 2, wherein the scheduling center system being configured to determine the target shore crane apparatus based on the ship information and the shore crane apparatus information comprises the scheduling center system being configured to:
determine one or more shore crane apparatuses in an idle state at the ship arrival time based on the ship arrival time and the operation time information of each shore crane apparatus; and
select one of the determined one or more shore crane apparatuses as the target shore crane apparatus.

4. The ship unloading control system of claim 2, wherein the scheduling center system being configured to generate the ship berthing task and the ship unloading task based on the ship unloading plan comprises the scheduling center system being configured to:
generate the ship berthing task containing identification information of the target shore crane apparatus and an operation area of the target shore crane apparatus, based on the ship unloading plan; and
generate the ship unloading task containing:
the identification information of the target ship,
ship unloading start time,
ship unloading end time,
identification information for each container transported by the target ship, and
a target container area for each container transported by the target ship, based on the ship unloading plan.

5. The ship unloading control system of claim 1, wherein the ship control system being configured to transmit the ship information and the container information to the scheduling center system comprises the ship control system being configured to:
determine a travel time length from a current location of the target ship to a port based on the current location, a location of the port and a travel route;
estimate arrival time at which the target ship arrives at the port based on the travel time length and current time; and
transmit the ship information containing the estimated arrival time and ship state information and the container information to the scheduling center system.

6. The ship unloading control system of claim 1, wherein the shore crane control system being configured to control the target shore crane apparatus to load the targeted container on the target ship onto the transportation vehicle in accordance with the ship unloading task comprises the shore crane control system being configured to:
confirm an identity of each container transported by the target ship in a predetermined container unloading order and control the target shore crane apparatus to hoist each container transported by the target ship when its identity is confirmed; and
control, upon receiving a vehicle in-position notification message from a vehicle control system of the transportation vehicle, the target shore crane apparatus to load the targeted container onto the transportation vehicle, mark the container in the ship unloading task as in an unloaded state, and transmit a ship unloading completion notification message to the scheduling center system and/or the ship control system of the target ship when determining that all containers in the ship unloading task are in the unloaded state.

7. The ship unloading control system of claim 6, wherein the predetermined container unloading order is an order in which containers are unloaded by columns, from top to bottom per column, by the target shore crane apparatus, and
the shore crane control system is further configured to, when confirmation of the identity of any of the containers transported by the target ship fails, lift and place a container that failed identification confirmation on top of another column of containers transported by the target ship whose identities have been confirmed on the target ship.

* * * * *